7562X
W. Zollikoffer.
Carriage Fender.
No. Patented Apr. 30, 1833.
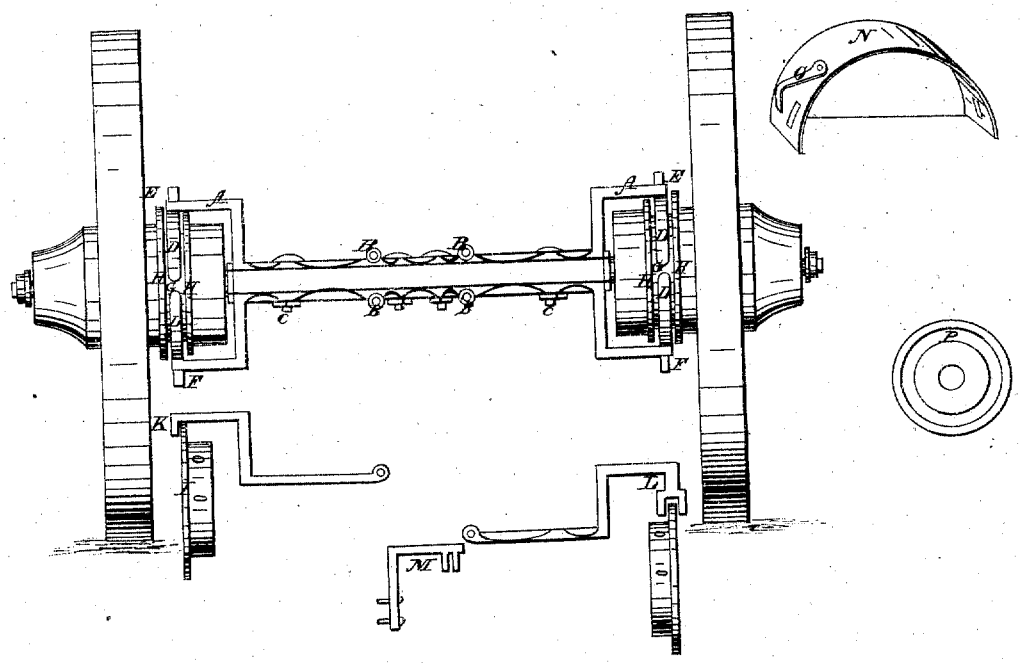
N. PETERS, PHOTO-LITHOGRAPHER, WASHINGTON, D. C.

No 11 7562X

Apl 30 1833 9/11

William Zollickoffer of Middleburg Maryland,

Letters Patent

The Schedule referred to in these Letters Patent, and making part of the same, containing a description in the words of the said William Zollickoffer, himself of his improvement; being an apparatus to prevent all kinds of Carriage wheels from falling when the axletree or the spindle of the axletree breaks or the linch-pin, or nut becomes disengaged; called "The Carriage wheel Guard". —

Be it known that I William Zollickoffer of the Town of Middleburg in the County of Frederick & State of Maryland, have invented a new & useful improvement, being an apparatus to prevent all kinds of Carriage wheels from falling when the spindle of the axle-tree or the axletree breaks, or the linch pin, or nut, becomes disengaged, called the "Carriage wheel Guard". which is described as follows.

This apparatus consists of a cylindrical flanged rim of iron; guards, a circular collar; & a semicircular cap.

The axle tree & wheels are made in the usual manner.

The cylindrical flanged rim of iron, is either cast whole with the nub, or in sections & screwed to its periphery in a groove having two flanges, one on each side, raised sufficiently high to form a groove to receive the collar; or with only one flange when a forked piece is substituted for the collar hereafter described.

The guards are made of iron nearly in the form of the letter Z, & secured to the axle tree by a joint & screw bolt; to each axletree there are four guards two on each side The circular collar, made of iron, is secured to the ends of the guards, and is put around the cylindrical rim in the groove formed by the flanges.

4

7562X

A semicircular cap secured to the guards by hooks & staples is put over the hub to prevent dirt falling in the groove around the rim.

Instead of having the grooved rim put on the periphery of the hub it may be let into a groove made in the inner end of the hub with the collar applied as before described.

A forked piece of iron may be substituted for the circular collar; in this case only one flange on the rim will be necessary, which will turn within the forked piece without touching it..... When the axle turns as in railway cars the apparatus must be fastened to the frame work of the car.. —— The operation is thus; when the axletree is whole and the linchpin or nut secure the wheel turns without touching any part of the guard or collar; but should the spindle of the axletree break or the linch pin or nut become disengaged, then the wheel would be prevented from falling by the cylindrical collar on the ends of the guards put around the hub between the flanges of the rim as before described, & the wheel would continue to revolve, without any impediment except that created by the friction of the collar & rim Should the axletree break at the shoulder of the spindle ~~or rim~~ or in any other part the wheel will still be preserved in its ordinary position; but will become partially locked from the friction of the collar.—

Simply inserting a pin thro' an opening in the end of the guard, or bending the ends of the guard downwards at right angles, so as to come on the outside of the flange, will also prevent the wheel getting out of its proper position in either of the before mentioned contingencies.

For a further illustration of my invention I refer to the model and drawings of the same deposited in the Patent Office. . . . . . . . . . . . . . . . . . . . .

What

7562X

What I claim as my invention and wish to secu
by Letters Patent is the before described apparatus f
preventing all kinds of carriage wheels getting out of the
proper position when the axletree or the spindle of the
tree breaks, or the linch pin or nut becomes disengage

In testimony whereof I hereunto subscrib
my name this 25th day of April 18[illegible].

Witnesses
William P. Elliot
C. F. Little

Wm Zollickoffer ([illegible] pat folio)

748 nb